April 14, 1953 W. O. GEHEB 2,634,865
POT LID HOLDER
Filed May 12, 1952

INVENTOR.
William O. Geheb
BY
Attorney

Patented Apr. 14, 1953

2,634,865

UNITED STATES PATENT OFFICE 2,634,865

POT LID HOLDER

William O. Geheb, Chicago, Ill.

Application May 12, 1952, Serial No. 287,276

4 Claims. (Cl. 211—41)

My invention relates to devices for holding removably a multiplicity of pot lids in compact arrangement.

An important object of my invention is to provide an article of the aforementioned character which consists of a horseshoe-shaped element having diverging leg portions, the said leg portions being provided with supporting lugs in aligned arrangement, and a U-shaped element secured at the terminal portions of the leg portions so that the article may be mounted on a wall, or other similar support, in angular position so as to support pot lids in perpendicular resting position on the said lug portions.

Another object of my invention is to provide an article of the aforementioned character which is provided with cutout portions in order to facilitate the arcuate bending formation at the crest thereof.

A still further object of my invention is to provide an article of the aforementioned character which will support pot lids of varied diameters and will support quite a number of the same.

A further object of my invention is to provide an article of the aforementioned character which may be mounted angularly on a support so as to removably hold a multiplicity of pot holders in gravitationally perpendicular arrangement and in parallel relationship one to the other.

A still further object of my invention is to provide an article of the aforementioned character which is made of sheet metal, or plastic material, which may be readily molded or stamped, and an article which is of such simplicity as to lend itself ideally toward economical manufacture in quantity production.

Other objects, features and advantages inherent in my invention will become apparent from an examination of the accompanying drawings, bearing further elucidation in the ensuing description, where like symbols are used to designate like parts, and in which.

Figures 1, 2, 3, 4:
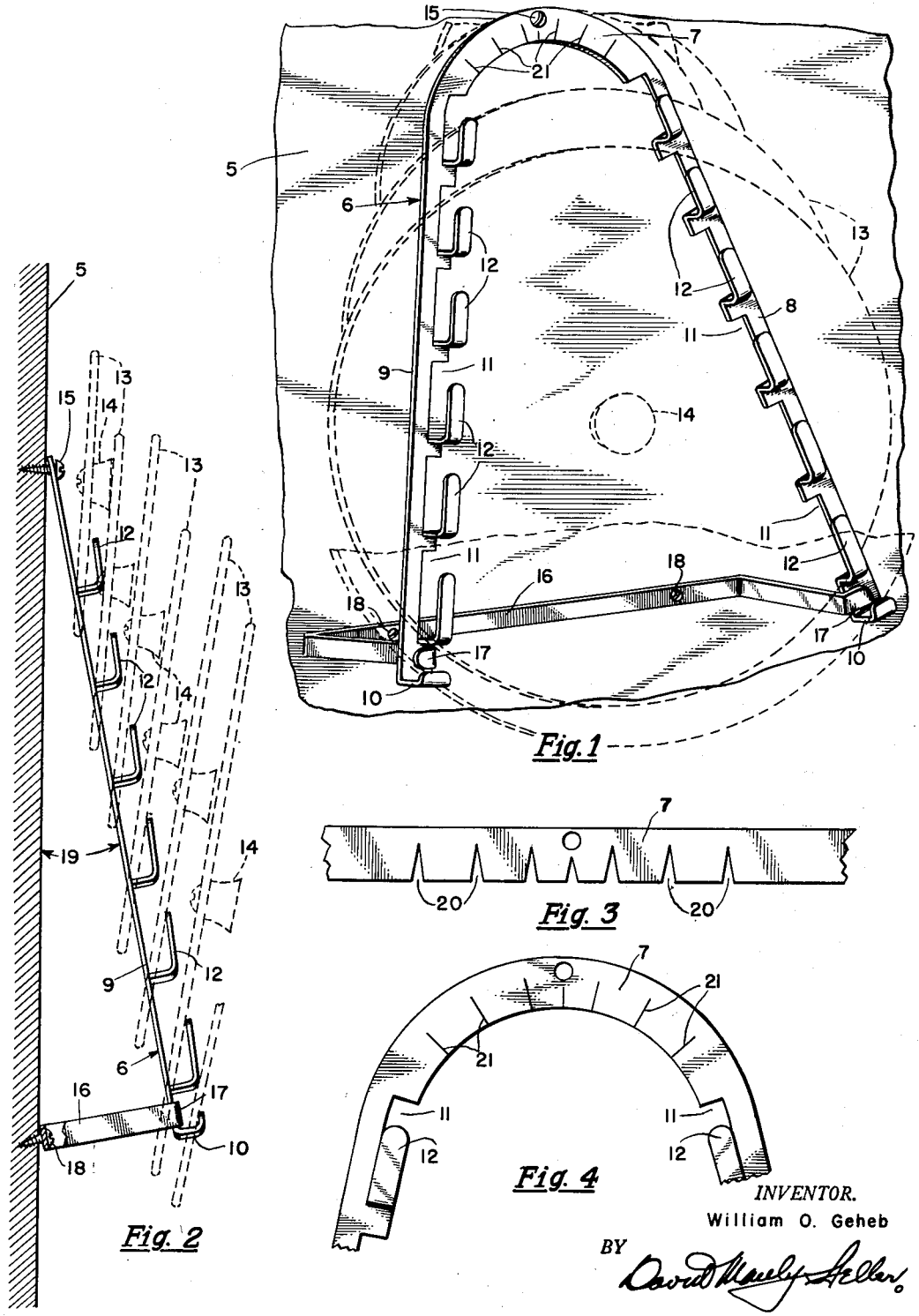
Fig. 1 is a perspective view showing my invention mounted on a wall and showing in phantom thereon, a number of pot lids removably supported thereby.
Fig. 2 is a side view of Fig. 1 showing the angular relationship with respect to the mounting of my invention on the said wall, or any other similar support.
Fig. 3 is a fragmentary development showing the practice to be followed in facilitating the curved formation of the arcuate crest portion of my invention.
Fig. 4 is a fragmentary and enlarged view of the arcuate portion of my invention shown bent to the desired configuration.

Referring to the various views, a wall or other support on which my invention may be mounted is designated 5; my invention being generally designated 6, and consisting of an arcuate crest portion 7 terminating in two diverging leg portions 8 and 9, each leg terminating in bent lug portion 10 at the termini thereof to form a bottom or lowermost pot lid support.

The crest portion 7 as illustrated in Figs. 3 and 4, is preferably provided with a number of cut-out V-portions 20, so as to permit bending the said crest portion to an arcuate shape by closing the gaps left by the triangular portions which have been removed and causing the angular arch formations 20 to be closed as indicated at 21 in Fig. 4.

The leg portions 8 and 9 are provided with a number of cut-out portions so as to permit the formation of pot lid supporting lug portions 12 at the cut out portions 11, furnishing the necessary material for the forming of the lug supports 12. Thus, a number of pot lids 13 having handles 14 can be supported in parallel relationship one to the other, and in perpendicular relationship by virtue of the fact that a U-shaped element 16 is provided having angularly formed ledges 17 at the termini thereof, so that the same may be spot-welded as indicated at the bottom of the termini of the legs 8 and 9. Thus, the device may be mounted by screws 15 and 18 to assume the angular relationship 19 to the wall 5.

The device, after being mounted on the wall, will support a number of pot lids 13 by embracing an arcuate section thereof so that the same may vary in size, the smaller pot lids being supported at the top, and the larger pot lids at the bottom. This varied supporting feature is attributable to the divergent leg portions 8 and 9 of the horseshoe-shaped element comprising an important part of my invention.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and any that may come within the purview of the foregoing description; my invention to be limited only by the appended claims.

Having thus disclosed and revealed my invention, what I claim as new and desire to secure by Letters Patent is:

1. A pot lid holder of horseshoe configuration provided with a pair of divergent leg portions terminating in bent lug portions and an arcuately-formed crest portion, a multiplicity of cut-out portions providing bent lid supporting lug portions evenly spaced longitudinally on the said leg portions, a U-shaped element having ledge portions secured substantially adjacent the termini of the said leg portions and in transverse relationship thereto to afford angularity to the said pot lid holder when hung on a wall by the said crest portion, the said pot lid holder being made of a single strip of material, and a multiplicity of notches of V-formation at the crest portion thereof to facilitate forming the said crest portion to conform to arcuate configuration by closure of the said notches.

2. A pot lid holder of horseshoe configuration provided with a pair of divergent leg portions terminating in bent lug portions and an arcuately-formed crest portion, a multiplicity of cut-out portions providing bent lid supporting lug portions evenly spaced longitudinally on the said leg portions, a U-shaped element having ledge portions secured substantially adjacent the termini of the said leg portions and in transverse relationship thereto to afford angularity to the said pot lid holder when hung on a wall by the said crest portion, the said pot lid holder being made of a single strip of material, a multiplicity of notches of V-formation at the crest portion thereof to facilitate forming the said crest portion to conform to arcuate configuration by closure of the said notches, bored hole means in the said crest portion and in the base portion of the said U-shaped element adapted to receive screws.

3. A pot lid holder of horseshoe configuration provided with a pair of divergent leg portions terminating in bent lug portions and an arcuately-formed crest portion, a multiplicity of cut-out portions providing bent lid supporting lug portions evenly spaced longitudinally on the said leg portions, a U-shaped element having ledge portions secured substantially adjacent the termini of the said leg portions and in transverse relationship thereto to afford angularity to the said pot lid holder when hung on a wall by the said crest portion, the said pot lid holder being made of a single strip of material, and a multiplicity of notches of V-formation at the crest portion thereof to facilitate forming the said crest portion to conform to arcuate configuration by closure of the said notches, the said divergent leg portions affording removable support to pot lids of varied diametral magnitudes.

4. A pot lid holder of horseshoe configuration provided with a pair of divergent leg portions terminating in bent lug portions and an arcuately-formed crest portion, a multiplicity of cut-out portions providing bent lid supporting lug portions evenly spaced longitudinally on the said leg portions, a U-shaped element having ledge portions secured substantially adjacent the termini of the said leg portions and in transverse relationship thereto to afford angularity to the said pot lid holder when hung on a wall by the said crest portion, the said pot lid holder being made of a single strip of material, a multiplicity of notches of V-formation at the crest portion thereof to facilitate forming the said crest portion to conform to arcuate configuration by closure of the said notches, bored hole means in the said crest portion and in the base portion of the said U-shaped element adapted to receive screws for securing the assembly to a supporting surface, the said divergent leg portions affording removable support to pot lids of varied diametral magnitudes.

WILLIAM O. GEHEB.

References Cited in the file of this patent

UNITED STATES PATENTS

| Number | Name | Date |
|---|---|---|
| 1,108,043 | Weder et al. | Aug. 18, 1914 |
| 1,266,245 | Fuhrmann | May 14, 1918 |
| 1,386,775 | Fulford | Aug. 9, 1921 |
| 1,920,354 | Carpenter | Aug. 1, 1933 |
| 2,061,588 | Peschel | Nov. 24, 1936 |
| 2,157,001 | Morley | May 2, 1939 |

FOREIGN PATENTS

| Number | Country | Date |
|---|---|---|
| 357,145 | Great Britain | Sept. 16, 1931 |